(12) United States Patent
Ates et al.

(10) Patent No.: US 12,428,941 B2
(45) Date of Patent: Sep. 30, 2025

(54) CLOSED LOOP HYDROGEN PRODUCTION AND STORAGE

(71) Applicant: SAUDI ARABIAN OIL COMPANY, Dhahran (SA)

(72) Inventors: Harun Ates, Katy, TX (US); Sampath K. Bommareddy, Sugar Land, TX (US); Sehmus Ozden, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 128 days.

(21) Appl. No.: 18/437,870

(22) Filed: Feb. 9, 2024

(65) Prior Publication Data

US 2025/0257639 A1     Aug. 14, 2025

(51) Int. Cl.
| | |
|---|---|
| *E21B 43/16* | (2006.01) |
| *B65G 5/00* | (2006.01) |
| *E21B 41/00* | (2006.01) |
| *E21B 43/40* | (2006.01) |

(52) U.S. Cl.
CPC .............. *E21B 43/164* (2013.01); *B65G 5/00* (2013.01); *E21B 41/0064* (2013.01); *E21B 43/40* (2013.01)

(58) Field of Classification Search
CPC ....................................................... E21B 41/00
See application file for complete search history.

(56) References Cited

U.S. PATENT DOCUMENTS

| | | | |
|---|---|---|---|
| 7,449,167 B2 | 11/2008 | Garg et al. | |
| 8,241,374 B2 | 8/2012 | Bavarian et al. | |
| 9,409,773 B2 | 8/2016 | Achilles et al. | |
| 2013/0230449 A1 | 9/2013 | Doshi et al. | |
| 2023/0167719 A1 | 6/2023 | Vinegar et al. | |
| 2025/0027386 A1* | 1/2025 | Gao | E21B 43/255 |
| 2025/0122779 A1* | 4/2025 | Schottenfeld | E21B 41/0057 |

FOREIGN PATENT DOCUMENTS

| | | | | |
|---|---|---|---|---|
| GB | 2628423 | * | 9/2024 | ............. E21B 43/15 |
| RU | 2713349 C1 | | 2/2020 | |

OTHER PUBLICATIONS

Hague, Oliver; What are the 3 Main Types of Hydrogen?; 2021; retrieved from https://www.brunel.net/en/blog/renewable-energy/3-main-types-of-hydrogen.

(Continued)

*Primary Examiner* — William D Hutton, Jr.
*Assistant Examiner* — Avi T Skaist
(74) *Attorney, Agent, or Firm* — Vorys, Sater, Seymour and Pease LLP

(57) ABSTRACT

A method includes extracting natural gas from a subsurface formation including a conventional gas reservoir via a first wellbore penetrating the subsurface formation, processing the natural gas in a surface processing facility and thereby generating hydrogen and a carbon dioxide ($CO_2$) brine, injecting at least a portion of the hydrogen into the subsurface formation via a second wellbore penetrating the subsurface formation for hydrogen storage, and injecting the $CO_2$ brine into a saline aquifer forming part of the subsurface formation via a third wellbore penetrating the subsurface formation.

17 Claims, 4 Drawing Sheets

(56) References Cited

OTHER PUBLICATIONS

Parkinson, B. et al.; Hydrogen production using methane: Techno-economics of decarbonizing fuels and chemicals; International Journal of Hydrogen Energy 43, 2540-2555, (2018).

Ram Ramachandran, Raghu K. Menon, an overview of industrial uses of hydrogen, International Journal of Hydrogen Energy, vol. 23, Issue 7, 1998, pp. 593-598.

Muradov, Nazim Z., Hydrogen via methane decomposition: an application for decarbonization of fossil fuels, International Journal of Hydrogen Energy 26 (2001): 1165-1175.

Rostrup-Nielsen, Jens Richard and Thomas Rostrup-Nielsen. "Large-Scale Hydrogen Production." CATTECH 6 (2002): 150-159.

Rostrup-Nielsen, J.R. & Sehested, Jens & Noerskov, Jens. (2003). Hydrogen and Synthesis Gas by Steam and CO2 Reforming. Cheminform. 34. 10.1002/chin.200317288.

Wongsakulphasatch, Suwimol et al. "Intensified processes of steam reforming and their materials for hydrogen production." (2020).

Boretti, Albert & Banik, Bimal. (2021). Advances in Hydrogen Production from Natural Gas Reforming. Advanced Energy and Sustainability Research. 2. 2100097. 10.1002/aesr.202100097.

Hazzim F. Abbas, W.M.A. Wan Daud, Hydrogen production by methane decomposition: A review, International Journal of Hydrogen Energy, vol. 35, Issue 3, 2010, pp. 1160-1190.

Joakim Andersson, Stefan Grönkvist, Large-scale storage of hydrogen, International Journal of Hydrogen Energy, vol. 44, Issue 23, 2019, pp. 11901-11919.

Kruck, O., et al., "Overview of all known underground storage technologies for hydrogen" EU report (2016).

Londe, L.. "Underground Storage of Hydrocarbons: Advantages, Lessons Learnt and Way Forward." Paper presented at the Abu Dhabi International Petroleum Exhibition & Conference, Abu Dhabi, UAE, Nov. 2017.

Al-Shafi, Manal et al. "A review on underground gas storage systems: Natural gas, hydrogen and carbon sequestration." Energy Reports (2023): n. pag.

Carlo Cappellani, Natural Hydrogen: Promising opportunities for Exploration & Production; retrieved from https://www.oil-gasportal.com/wp-content/uploads/2022/05/Natural-Hydrogen_Article.pdf.

\* cited by examiner

CLOSED LOOP HYDROGEN PRODUCTION AND STORAGE

FIELD OF THE DISCLOSURE

The present disclosure relates generally to hydrogen production and, more particularly, to the production of hydrogen from depleting conventional natural gas reservoirs.

BACKGROUND OF THE DISCLOSURE

The detrimental effects that greenhouse gases can have on the environment are now well-known and observable. Greenhouse gas emissions prevent the escape of heat from the Earth's atmosphere and are a major contributor to global warming and climate change. Generally, there are five major greenhouse gases that most significantly impact global warming, two of which, carbon dioxide ($CO_2$) and methane ($CH_4$), are components of natural gas, with methane being the largest. When natural gas is used and/or burned, methane and other components of the natural gas are emitted into the atmosphere, thus greatly contributing to the total amount of greenhouse gases present in the air.

In the alternative, hydrogen, a major component of methane, when used and burned, produces no harmful greenhouse gases and is thus deemed a "clean" fuel source. For this reason, the world is embracing greater use of hydrogen as a major power source in an effort to help lower the amount of greenhouse gases present in the atmosphere.

Natural gas reservoirs and natural gas producing wells, despite being known for the production of methane, can be operative in the transition to clean fuel use and efforts to reduce greenhouse gases. What is needed are improved processes for hydrogen production utilizing existing natural gas wells.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure a method may include extracting natural gas from a subsurface formation including a conventional gas reservoir via a first wellbore penetrating the subsurface formation and processing the natural gas in a surface processing facility and thereby generating hydrogen and a carbon dioxide ($CO_2$) brine. The method may include injecting at least a portion of the hydrogen into the subsurface formation via a second wellbore penetrating the subsurface formation for hydrogen storage and injecting the $CO_2$ brine into a saline aquifer forming part of the subsurface formation via a third wellbore penetrating the subsurface formation.

According to an embodiment consistent with the present disclosure a closed-loop hydrogen production system may include a first wellbore penetrating a depleting subsurface formation for extracting natural gas from a conventional natural gas reservoir and a surface processing facility in fluid communication with the first wellbore to receive and process the natural gas and thereby generate hydrogen ($H_2$) and a carbon dioxide ($CO_2$) brine. The system may further include a second wellbore penetrating the subsurface formation for injecting at least a portion of the hydrogen into the subsurface formation for storage and a third wellbore penetrating the subsurface formation for injecting the $CO_2$ brine into a saline aquifer forming part of the subsurface formation.

According to an embodiment consistent with the present disclosure a method may include extracting natural gas from a conventional subsurface formation including a gas reservoir via a first wellbore penetrating the subsurface formation and processing the natural gas in a surface processing facility and thereby generating hydrogen and a carbon dioxide ($CO_2$) brine. The method may further include injecting the $CO_2$ brine into an aquifer forming part of the subsurface formation via a second wellbore penetrating the subsurface formation and supporting reservoir pressure of the conventional subsurface formation with the $CO_2$ brine.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
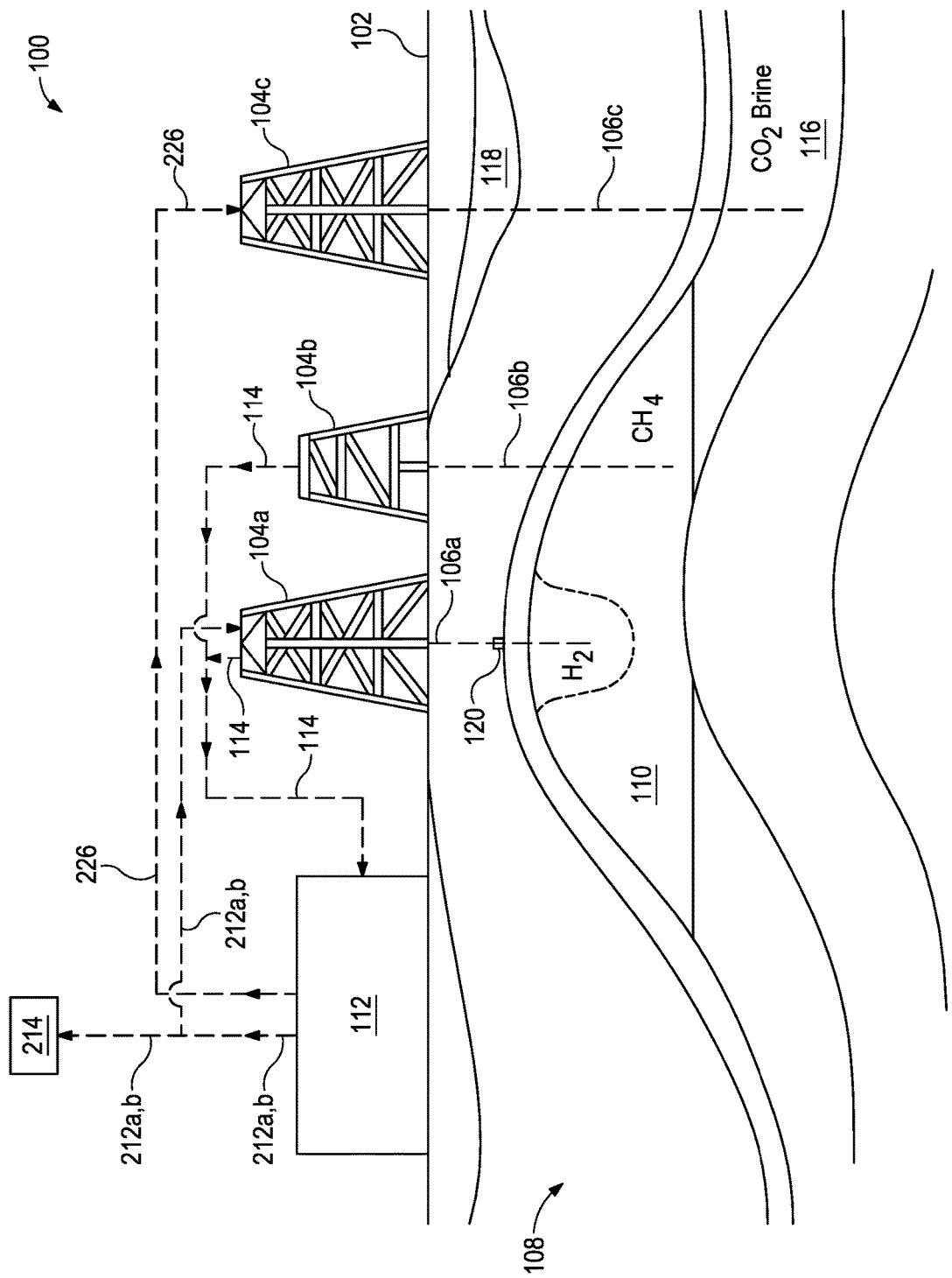
FIG. 1 is a schematic diagram of an example closed-loop hydrogen production system that may employ one or more principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to the production of clean hydrogen and, more particularly, to the production of hydrogen from conventional natural gas reservoirs that, while not completely depleted, may be partially or substantially depleted of their initial reservoir pressure. This disclosure describes a method of closed-loop hydrogen production that includes the extraction of natural gas from a depleting formation, separation of the natural gas components (namely, the separation of methane) at surface, and the subsequent reinjection of carbon dioxide back into the subterranean. The storage and production capacity of depleting natural gas reservoirs is tremendous and is only limited by its size, and the presence of an underlying or a nearby aquifer makes onsite carbon dioxide ($CO_2$) sequestration possible while preventing emissions and reducing the cost.

While the embodiments disclosed herein help in contributing less greenhouse gases to the volume currently present in the atmosphere, the method(s) presented herein are beneficial and advantageous for other reasons. The embodiments disclosed herein, for example, can maximize the use of existing wells and their surface facilities. More specifically, subsurface and surface installations already exist and can be used to reduce the cost of hydrogen ($H_2$) production. Moreover, storage reservoir data and subterranean trap structures from existing wells are well known from the time of exploration through to subsequent production; e.g., a good knowledge of the subsurface conditions generally exists from the past production history. Consequently, a conversion into underground gas storage is possible with only limited exploration effort and investments. Because of the availability of data and the understanding of the reservoir structure and behavior, this reduces the risks related to $H_2$ production and storage, and also enables a gradual transition from a small pilot area to a full field scale transformation of natural gas to blue hydrogen.

In some applications, as described herein, the separated $H_2$ may also be injected downhole for storage. In such applications, another advantage of the presently disclosed systems and methods is using the remaining methane gas in the partially-depleted reservoirs as a cushion gas to help maintain the reservoir pressure as $H_2$ is being extracted from said reservoir. Additionally, costly purification processes may be eliminated by using $H_2$ as the cushion gas as opposed to other known alternative cushion gases that must be removed as a portion of such gases mix with the $H_2$ as it is being extracted. In other applications, however, the presently disclosed systems and methods may eliminate the need for cushion gas.

FIG. 1 is a schematic diagram of an example closed-loop hydrogen production system 100 (herein after referred to as the "system 100") that may employ one or more principles of the present disclosure. As depicted, the system 100 may include one or more service rigs positioned on a terranean surface 102 and extending over and around one or more wellbores that extend vertically through various subterranean earth strata. In at least one embodiment, the system 100 may include three wellbores and three corresponding service rigs arranged at the surface 102, wherein each wellbore serves a particular purpose and may extend into a separate, distinct layer of the Earth's strata. In some embodiments, the system 100 may comprise more or less than three wellbores and corresponding service rigs without exceeding the scope of this disclosure.

While the system 100 is depicted as a land-based operation, it will be appreciated that the principles of the present disclosure could equally be applied in any offshore, sea-based, or sub-sea application where the service rig may be a floating platform, a semi-submersible platform, or a sub-surface wellhead installation as generally known in the art. Similarly, it will be appreciated by those skilled in the art that even though FIG. 1 depicts wellbores that are substantially vertical in direction, the embodiments described herein are equally applicable for wellbores that are horizontal, deviated, or otherwise slanted.

In the illustrated embodiment, the system 100 includes three discrete service rigs 104a, 104b, and 104c positioned over three discrete wellbores 106a, 106b, and 106c. The service rigs 104a-c may include, but are not limited to, drilling rigs, completion rigs, workover rigs, wellheads, or any combination thereof. Each of the wellbores 106a-c extends into a subsurface (subterranean) formation 108. One or more of the wellbores 106a-c may be lined with a configuration of casings and/or liners and/or tubing strings (not shown) that may extend from the surface 104 and into the subsurface formation 108. The configuration of the wellbores 106a-c is not pertinent to the methods disclosed herein and similarly, not considered limiting to the scope of this disclosure. As such, the construction and tubular configurations of each of the wellbores 106a-c shall not be discussed in further detail.

The first service rig 104a may be positioned above and operatively coupled to the first wellbore 106a which extends vertically into a conventional gas reservoir 110 provided within the subsurface formation 108. The conventional gas reservoir 110 may be a reservoir exhibiting characteristics of a sandstone, a carbonate or some formation having a certain amount of porosity and permeability. The conventional reservoir 110 may be distinguishable from an "unconventional" reservoir in that the natural porosity and permeability aids in the natural flow of hydrocarbons into the first wellbore 106a. As a result, in the disclosed embodiment, the first wellbore 106a may not have undergone completion and/or workover operations, such as hydraulic fracturing, or similar, to initiate or increase hydrocarbon production. Those of ordinary skill will be familiar with unconventional reservoirs, which generally include shales and tight gas sands and usually require completion operations to induce production.

In the example disclosed herein, the first wellbore 106a is capable of producing natural gas 114, which is conveying to a surface processing facility 112 capable of and otherwise configured to separate the extracted natural gas 114 into discrete hydrogen ($H_2$) and carbon dioxide ($CO_2$) parts. As hydrogen production has become more prevalent, a color chart has been developed that designates a color to each hydrogen production mechanism. "Blue" hydrogen is generally formed from natural gas wherein the natural gas undergoes a reformation process. During said reformation process, the hydrogen and carbon dioxide entrained within the natural gas are separated from one another. The separated hydrogen can then be used for multiple purposes or, in the alternative, stored for future use. The separated carbon dioxide may be sequestered and stored indefinitely, as opposed to being released into the atmosphere as discharge. Those of ordinary skill will know this concept as "carbon capture" or "carbon sequestration".

In some embodiments, the surface processing facility 112 may be an existing installation including equipment capable of handling and processing oil and natural gas 114. In an embodiment that repurposes existing facilities, the surface processing facility 112 may be redesigned or added to in order to accommodate equipment required to facilitate natural gas 114 separation, or similarly, methane reformation.

The surface processing facility 112 may include equipment configured to separate the extracted natural gas 114 into $H_2$ and $CO_2$ via a variety of methane reforming processes such as, but not limited to, steam methane reforming (SMR), autothermal reforming (ATR), dry reforming (DRM), partial oxidation (POX), pyrolysis, $H_2S$ Methane reforming, or any combination thereof. Additionally, the surface processing facility 112 may be designed to accommodate the type, or characteristics, of the natural gas 114 extracted from the subsurface formation 108. In one embodiment, for example, the surface processing facility 112 may be designed to receive "sour" gas, or natural gas 114 containing significant amounts of hydrogen sulfide ($H_2S$) and $CO_2$. In other embodiments, the surface processing facility 112 may be designed to receive "sweet" gas, or natural gas 114 that comprises little to no $H_2S$ and lesser quantities of $CO_2$.

The second service rig 104b is positioned above and is operatively coupled to the second wellbore 106b. The second wellbore 106b penetrates a portion of the conventional gas reservoir 110. In some embodiments, the second wellbore 106b may penetrate a portion of the gas reservoir 110 that comprises (includes) substantial amounts of $H_2S$ and $CO_2$ (e.g., "sour" gas). The produced sour natural gas 114 from the second wellbore 106b may be mixed with the natural gas 114 extracted from the first wellbore 106a (e.g., "sweet" gas) at the surface 102. The combined volume of natural gas 114 may then be directed to the surface processing facility 112 via a natural gas pipeline (or other conduit) to undergo a process of natural gas 114 reformation.

Over time, the conventional gas reservoir 110 will experience a loss in reservoir pressure from its initial production pressure (depletion). As a result, the first wellbore 106a may lose sufficient pressure and viability, while the second wellbore 106b may continue to produce. In at least one embodiment, for example, reservoir pressure at the first wellbore 106a may descend below a predetermined reservoir pressure where it is evident that the hydrocarbon reserves in the gas reservoir 110 are nominally depleted, partially depleted, substantially depleted, severely depleted, or any combination thereof. Accordingly, the conventional gas reservoir 110 may only be nominally depleted or in the alternative, partially depleted. In other embodiments, the conventional gas reservoir 110 may be severely depleted such that only a minimal amount of natural reservoir pressure remains within the conventional gas reservoir 110 and is producible only via the second wellbore 106b. In other embodiments, the conventional gas reservoir 110 may have undergone some type of production enhancing operations, without departing from the scope of this disclosure.

According to embodiments of the present disclosure, the natural gas 114 extracted from the second wellbore 106b may be processed in the surface processing facility 112 to produce $H_2$ and $CO_2$. The surface processing facility 112 may be designed to combine or integrate steam methane reforming (SMR) and $H_2S$ methane reforming processes into a single process, thereby allowing both sweet and sour natural gas 114 to be treated simultaneously. In some embodiments, as described herein, the produced $H_2$ may subsequently be injected back into the conventional gas reservoir 110 via the first wellbore 106a for storage.

Figure 2:
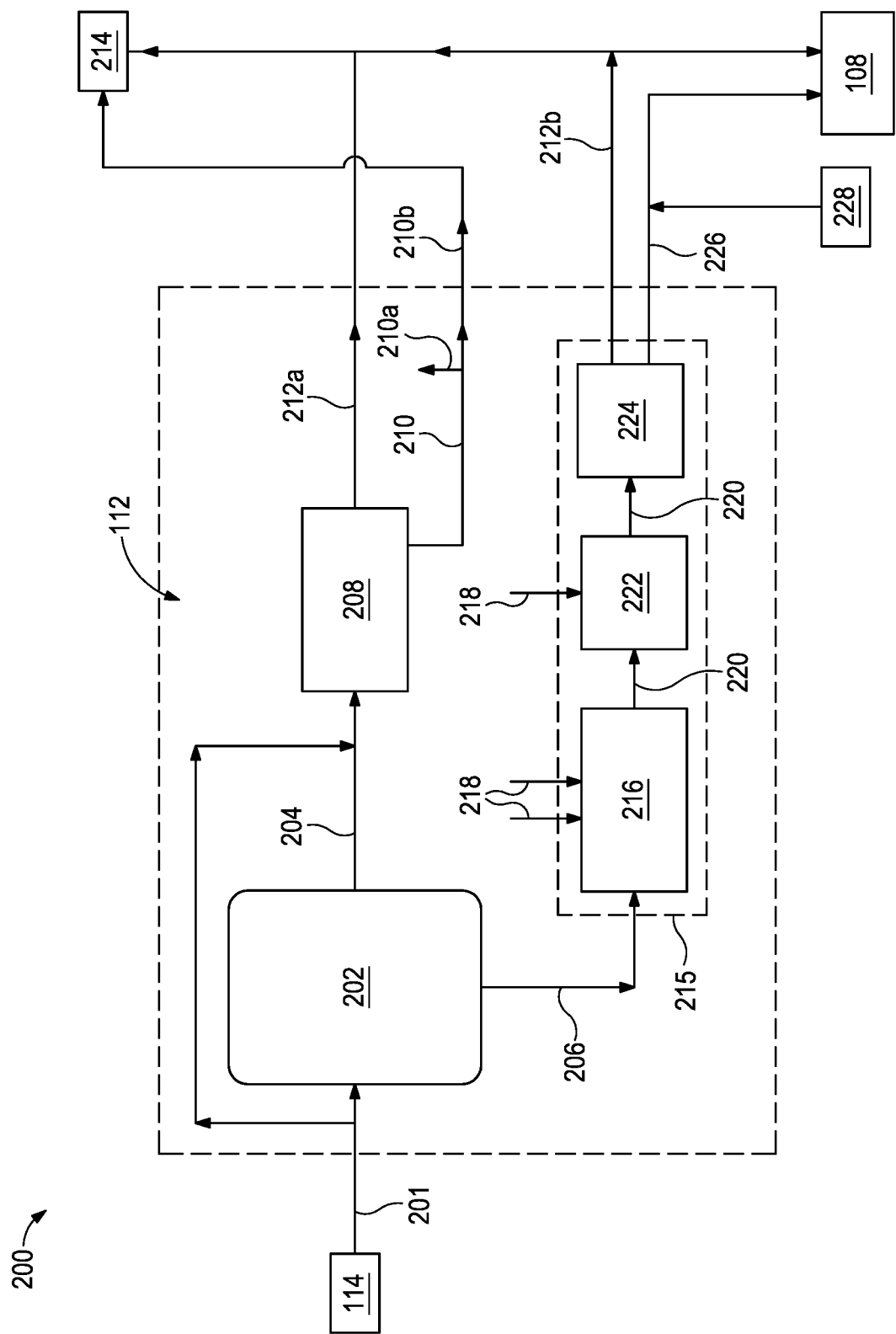
FIG. 2 is a schematic flowchart of an example hydrogen production process that may be used in the closed-loop hydrogen production system of FIG. 1, according to one or more embodiments.

FIG. 2 is a schematic flowchart of an example hydrogen production process 200 that may be included within the surface processing facility 112, according to one or more embodiments. As illustrated, the flow of natural gas 114 (including sweet or sour gas, or both) enters the surface processing facility 112 from a natural gas pipeline 201 fluidly coupled to one or both of the first and second wellbores 106a,b (FIG. 1). Because the natural gas 114 contains a mixture of $H_2S$ that must be removed prior to separating the remaining $H_2$ and $CO_2$, the natural gas 114 may first undergo a gas processing treatment 202, alternatively referred to as amine gas treating, amine scrubbing and/or gas sweetening. During the gas processing treatment 202, the $H_2S$ and some amount of $CO_2$ are removed from the natural gas 114. In some embodiments, ~75% of the $CO_2$ may be removed. In other embodiments, up to 90% of the $CO_2$ may be removed during the gas processing treatment 202. Consequently, in most embodiments, some percentage of $CO_2$ may remain after the natural gas 114 has been treated.

Following the gas processing treatment 202, an $H_2S$ rich gas 204 (hereinafter referred to as "$H_2S$ 204") and a sweet natural gas 206 are discharged. The $H_2S$ 204 may be directed to a catalytic reactor 208 wherein further separation processes occur resulting in the generation of a liquid carbon disulfide ($CS_2$) stream 210a, a solid sulfur byproduct stream 210b, and clean hydrogen 212a. In at least one embodiment, the separated liquid $CS_2$ stream 210a may be used in the manufacture of rubber, viscose rayon, cellophane, and/or tetrachloride. The solid sulfur byproduct stream 210b may be separated and transported directly to market 214.

In some applications, some or all of the resultant clean hydrogen 212a may be transported out of the surface processing facility 112 via pipeline directly to market 214 for sale and commercial and/or consumer consumption. Alternatively, or in addition to, a portion of the clean hydrogen 212a may be transported via pipeline to be reinjected into the subsurface formation 108 (FIG. 1) for storage and future use, as discussed in further detail below.

In some embodiments, the sweet natural gas 206 discharged from the gas processing treatment 202 may be conveyed to a methane reforming process 215 to generate $H_2$ and $CO_2$. The methane reforming process 215 can include, but is not limited to, steam methane reforming (SMR), autothermal reforming (ATR), dry reforming (DRM), partial oxidation (POX), pyrolysis, $H_2S$ Methane reforming, or any combination thereof. In the illustrated embodiment the methane reforming process comprises SMR, which is an endothermic process that requires heat. In conventional SMR, high-temperature steam (usually ~700° C.-1,000° C.) is used under pressure with a catalyst to produce hydrogen, carbon monoxide and some small amount of carbon dioxide.

As illustrated, the sweet natural gas 206 may travel from the gas processing treatment 202 into a reactor 216 of the methane reforming process 215. Steam 218 is injected into the reactor 216, which contains a first catalyst. In some embodiments, the steam 218 may be produced from a portion of the natural gas 114 having heavier hydrocarbon components.

Within the reactor 216, the steam 218, at high temperatures of ~300° C.-1,000° C. (~572° F.-1,832° F.) reacts with the sweet natural gas 206 under pressure of ~3 bar-25 bar (~44 psi-363 psi). In most embodiments, the steam 218 may be injected at a temperature of or around 700° C. The reaction produces a synthetic gas or "syngas" 220 primarily including hydrogen ($H_2$) and carbon monoxide (CO), but may also include carbon dioxide ($CO_2$). The resultant syngas 220 may then be conveyed to a water-gas shift reactor 222 where, in the presence of the steam 218 and a second catalyst, the CO within the syngas 220 is converted into $CO_2$ and additional $H_2$. The syngas 220, now comprising only $CO_2$ and $H_2$, may then be introduced into a pressure-swing adsorber 224, where the syngas 220 is further separated so that the majority of the $CO_2$ is removed and separated, leaving an essentially pure stream of hydrogen 212b.

In the illustrated embodiment, the extracted $CO_2$ may be blended with produced water 228 (a byproduct of the natural gas 114 as the oil and natural gas 114 is extracted from the wellbore 106a) to form a dense $CO_2$ brine 226. The $CO_2$ brine 226 may be subsequently injected into the subsurface formation 108 for sequestration and storage, as discussed in further detail below. In other embodiments, the $CO_2$ may be separated in the form of a gas or foam.

Referring again to FIG. 1, with continued reference to FIG. 2, some or all of the streams of hydrogen 212a,b generated at the surface processing facility 112 may be conveyed directly to market 214 for sale or consumption. The market 214 may include, but is not limited to, transmission pipelines that direct the hydrogen 212a,b to distribution lines, storage facilities, and the like. Accordingly, the term "market" as used in the market 214 is not considered to be limiting to the scope of this disclosure.

In the alternative, some or all of the generated streams hydrogen 212a,b may be conveyed (transported) from the surface processing facility 112 to be injected into the subsurface formation 108 for storage and future use. Those of ordinary skill will be familiar with subterranean structures commonly used for $H_2$ storage and that may include, but are not limited to, salt domes/caverns, depleted oil and gas reservoirs and saline aquifers. Generally, in instances wherein the $H_2$ is injected into a depleted (partially or otherwise) oil and gas reservoir, the injection point may be an existing well or a well designed for the specific purpose of $H_2$ injection. Most often, the $H_2$ is not re-injected into the wellbore from which it originated (i.e., 106b).

According to embodiments of the present disclosure, the hydrogen 212a,b may be re-injected into the conventional gas reservoir 110 from which it was originally extracted (e.g., in its initial natural gas 114 state). This process "closes the loop" from methane production, to reformation, to hydrogen storage. In some embodiments, as illustrated in FIG. 1, the hydrogen 212a,b may be injected into the conventional gas reservoir 110 via the first wellbore 106a for storage. The first wellbore 106a, while no longer viable for producing natural gas 114, still retains some of its natural reservoir pressure because the conventional gas reservoir is not fully depleted. The injected hydrogen 212a,b ($H_2$) may then be stored within the partially or substantially depleted conventional gas reservoir 110 until removal of the stored hydrogen 212a,b is necessary and/or desirable. The natural gas 114 remaining within the conventional gas reservoir 110 may serve as cushion gas, maintaining a reservoir pressure high enough to permit retrieval of the hydrogen 212a,b. Thus the requirement of injecting cushion gas to support the recovery of stored hydrogen 212a,b may be eliminated, which provides cost savings as operational time is greatly improved.

In some embodiments, the first wellbore 106a may include an hydrogen separation membrane system 120 The membrane system 120 may be porous or nonporous, and may be designed to capture and/or separate out any trace amount of contaminants from the recovered hydrogen 212a,b, such as $H_2S$, $CO_2$, or carbonyl sulfide (COS). The membrane system 120 may further be configured to capture and/or separate various metals from the stream of hydrogen 212a,b, such as mercury and arsenic. The membrane system 120 may be configured with selectivity for $H_2$, thus substantially preventing the passage of other contaminants into the gas reservoir 110.

The $CO_2$ brine 226 generated from the surface processing facility 112 may be transported via pipeline back to the terranean surface 102 for injection and storage within the subterranean formation 108. Similar to the hydrogen storage, there are several subterranean structures that may be utilized for carbon dioxide ($CO_2$) storage. For example, it is known that saline aquifers are generally considered most ideal. Saline aquifers are saturated with brine and located deep within the Earth's strata, so there is less concern about $CO_2$ migrating and contaminating the shallower fresh water aquifers. Additionally, saline aquifers have been estimated to have storage volumes capable of housing large quantities of $CO_2$.

In conventional carbon sequestration operations, the $CO_2$ is injected in its gaseous state into a receivable reservoir. Because conventional carbon sequestration operations inject the $CO_2$ in gas form, the $CO_2$ has greater likelihood for migration regardless of whether the $CO_2$ is injected into a saline aquifer or another subterranean structure. According to embodiments of the present disclosure, the $CO_2$ brine 226 may be injected into the subterranean formation 108 via the third service rig 104c and interconnected third wellbore 106c, which extends vertically into a saline aquifer 116 forming part of the subterranean formation 108. The $CO_2$ brine 226 may be injected into the third wellbore 106c such that the properties of the saline aquifer 116 may dissolve some portion of the $CO_2$. In addition, because the $CO_2$ brine 226 is comprised of both $CO_2$ and brackish water, the $CO_2$ brine 226 is denser than gas and the saline aquifer water, and due to buoyancy, is less likely to migrate into a fresh water aquifer 118. Injecting the $CO_2$ brine 226 into the saline aquifer 116 requires a level of formation pressure depletion such that one can safely inject and have more room to store $CO_2$ in the aquifer. Therefore, the system 100 is not only ideal for $H_2$ production and storage but also ideal for $CO_2$ storage. Moreover, injecting the $CO_2$ brine 226 into the saline aquifer 116 helps support the reservoir pressure for the natural gas 114 being extracted from the second wellbore 104b, which enhances productivity of the natural gas 114.

Figure 3:
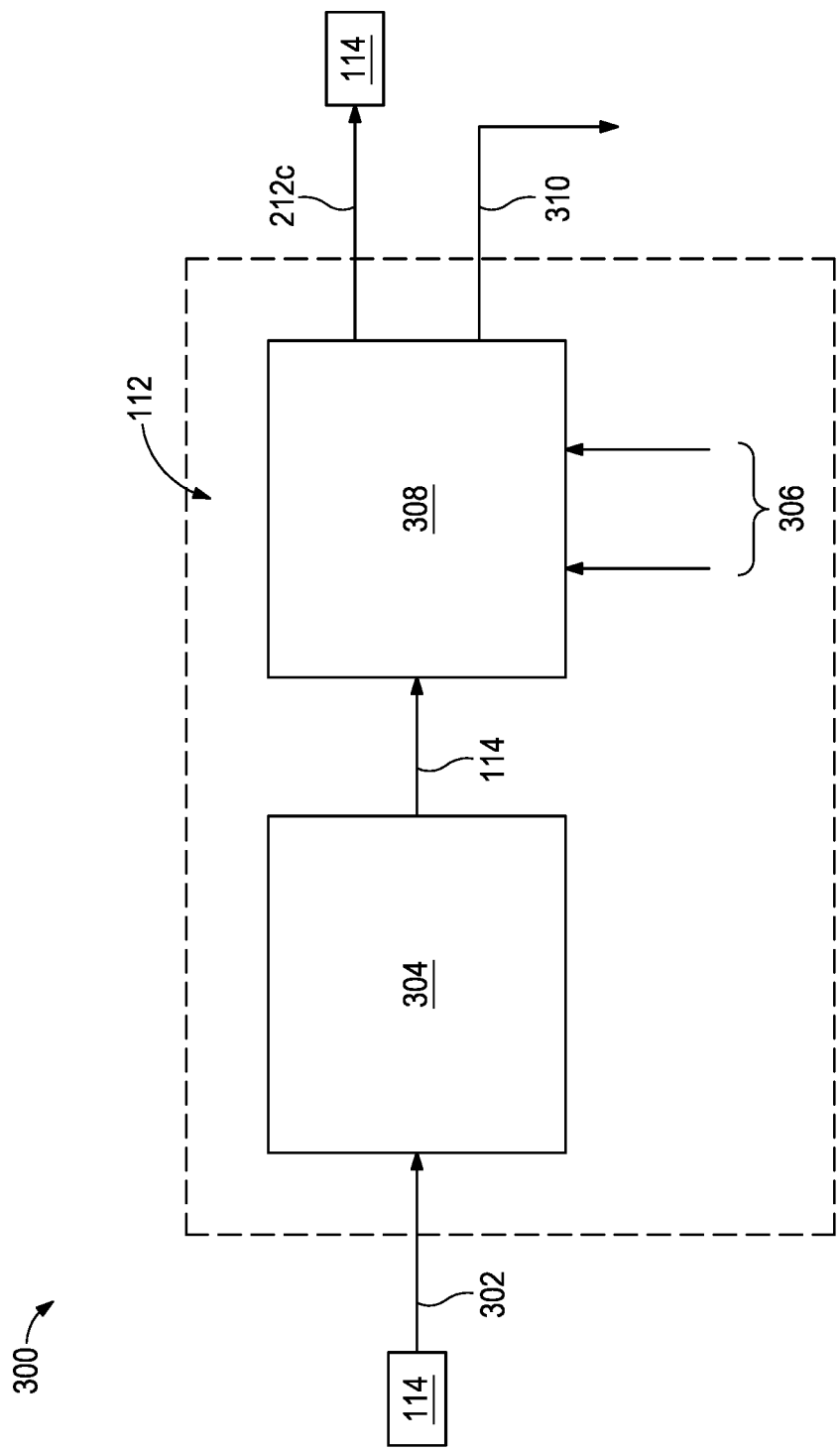
FIG. 3 is a flowchart illustration of another example hydrogen production process that may be used in the closed-loop hydrogen production system of FIG. 1, according to one or more embodiments.

FIG. 3 is a schematic flowchart of another example hydrogen production process 300 that may be included in the surface processing facility 112, according to one or more additional embodiments. As illustrated, the natural gas 114 may enter the surface processing facility 112 from a natural gas pipeline 302 fluidly coupled to one or both of the first and second wellbores 106a,b (FIG. 1). Upon entry, the natural gas 114 undergoes a methane reforming process including a desulfurization process 304, wherein the sulfur or sulfur compounds may be removed from the natural gas 114. The resultant natural gas 114 is introduced into a thermal reactor 308 configured to generate hydrogen 212c. In some embodiments, a carrier gas 306 is added to the thermal reactor 308. The carrier gas 306 may comprise an inert gas, such as nitrogen ($N_2$), argon (Ar), or a mixture thereof. Both the natural gas 114 and the carrier gas 306 enter into the thermal reactor 308 at a velocity that may be appropriate to the size of the thermal reactor 308 utilized.

The thermal reactor 308 utilizes heat and a catalyst to produce the hydrogen 212c and solid carbon 310 via rapid thermal cracking of the natural gas 114. The solid carbon 310 may comprise, for example, amorphous carbon, carbon nanotubes, or nanofibers. Similar to the reformation processes describe above, the thermal reactor 308 requires extreme temperatures (~300° C.-1,200° C. or ~572° F.-2,192° F.). The resultant hydrogen 212c may then be transported to market 214, or injected into the subsurface formation 108 (FIG. 1) in accordance with the methods disclosed above.

Figure 4:
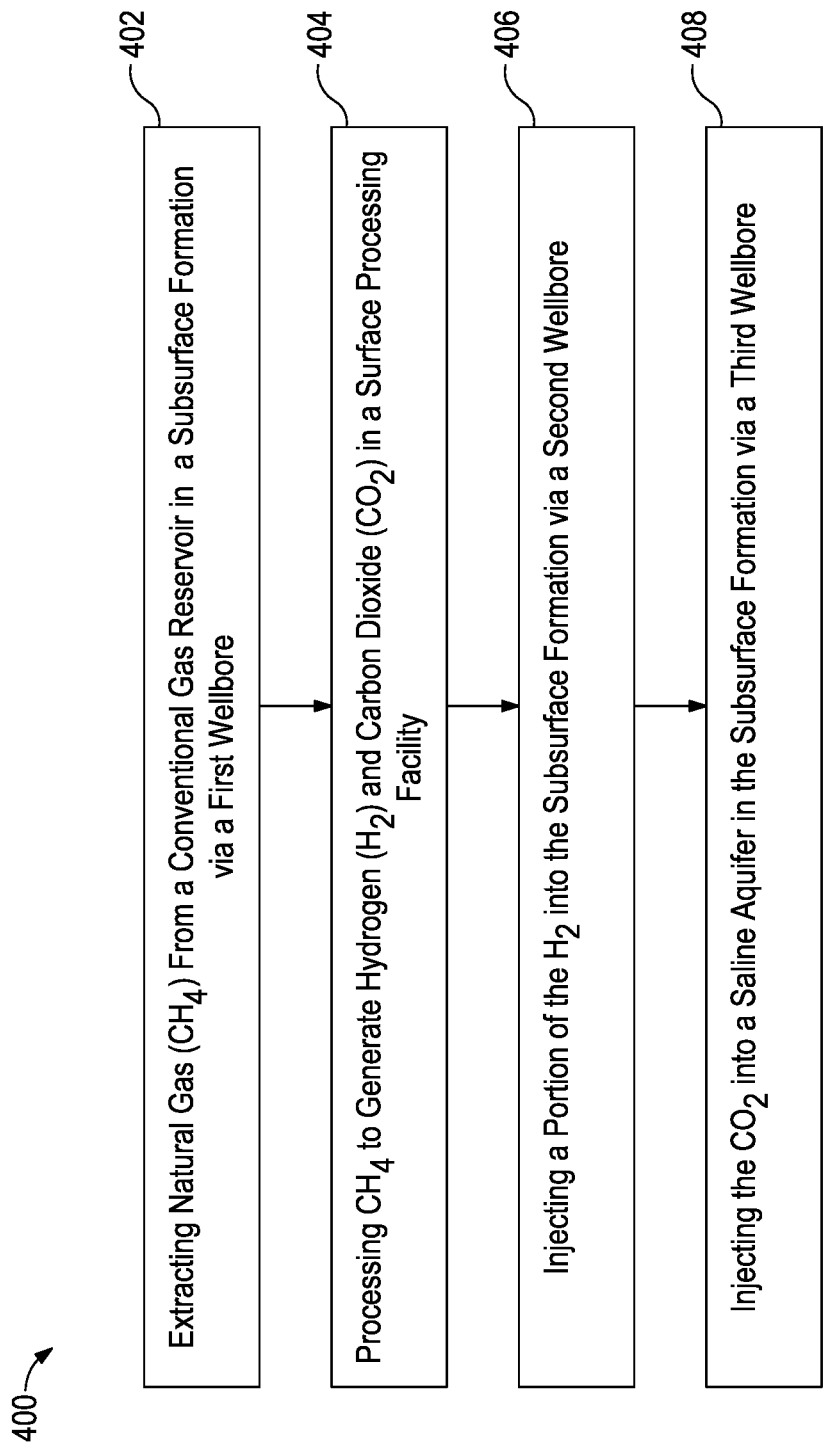
FIG. 4 is a schematic flowchart of an example hydrogen production method 400, according to one or more embodiments.

FIG. 4 is a schematic flowchart of an example hydrogen production method 400, according to one or more embodiments. The method 400, may include extracting natural gas from a subsurface formation including a conventional gas reservoir via a first wellbore penetrating the subsurface formation, as at 402. The gas reservoir may be a partially or substantially depleted conventional reservoir. The method

400, may include processing the natural gas in a surface processing facility and thereby generating hydrogen and a carbon dioxide ($CO_2$) brine, as at 404. The processing of the natural gas comprises, in part, methane reformation process may include steam methane reformation, autothermal reformation (ATR), dry reformation (DRM), partial oxidation (POX), pyrolysis, $H_2S$ Methane reformation, or any combination thereof, wherein the methane is separated into hydrogen, carbon dioxide, and/or any resultant components. The method 400, may include injecting at least a portion of the hydrogen into the subsurface formation via a second wellbore penetrating the subsurface formation for hydrogen storage, as at 406. In the alternative, a portion of the hydrogen may be transported to the market. The method 400, may then include injecting the $CO_2$ brine into a saline aquifer forming part of the subsurface formation via a third wellbore penetrating the subsurface formation, as at 408. The stored $CO_2$ brine may then be operable in maintaining reservoir pressure when producing natural gas from the first wellbore.

Embodiments disclosed herein include:

A. A method including extracting natural gas from a subsurface formation including a conventional gas reservoir via a first wellbore penetrating the subsurface formation. The method including processing the natural gas in a surface processing facility and thereby generating hydrogen and a carbon dioxide ($CO_2$) brine and injecting at least a portion of the hydrogen into the subsurface formation via a second wellbore penetrating the subsurface formation for hydrogen storage. The method including injecting the $CO_2$ brine into a saline aquifer forming part of the subsurface formation via a third wellbore penetrating the subsurface formation.

B. A closed-loop hydrogen production system, including a first wellbore penetrating a depleting subsurface formation for extracting natural gas from a conventional natural gas reservoir and a surface processing facility in fluid communication with the first wellbore to receive and process the natural gas and thereby generate hydrogen ($H_2$) and a carbon dioxide ($CO_2$) brine. The system including a second wellbore penetrating the subsurface formation for injecting at least a portion of the hydrogen into the subsurface formation for storage and a third wellbore penetrating the subsurface formation for injecting the $CO_2$ brine into a saline aquifer forming part of the subsurface formation.

C. A method, including extracting natural gas from a conventional subsurface formation including a gas reservoir via a first wellbore penetrating the subsurface formation and processing the natural gas in a surface processing facility and thereby generating hydrogen and a carbon dioxide ($CO_2$) brine. The method including injecting the $CO_2$ brine into an aquifer forming part of the subsurface formation via a second wellbore penetrating the subsurface formation and supporting reservoir pressure of the conventional subsurface formation with the $CO_2$ brine.

Each of embodiments A, B, and C may have one or more of the following additional elements in any combination: Element 1: wherein processing the natural gas comprises generating $CO_2$ from a methane reforming process and mixing the $CO_2$ with produced water to produce the $CO_2$ brine. Element 2: wherein the methane reforming process is selected from the group consisting of steam methane reforming (SMR), autothermal reforming (ATR), dry reforming (DRM), partial oxidation (POX), pyrolysis, $H_2S$ Methane reforming, and any combination thereof. Element 3: wherein generating the $CO_2$ from the methane reforming process is preceded by extracting hydrogen sulfide and carbon dioxide from the natural gas in a gas processing treatment. Element 4: the method further comprising subjecting the natural gas to amine gas treating. Element 5: wherein extracting the natural gas from the subsurface formation via the first wellbore is preceded by extracting natural gas from the subsurface formation via the second wellbore until a reservoir pressure at the second wellbore descends below a predetermined reservoir pressure. Element 6: wherein the predetermined reservoir pressure comprises reservoir pressure that is nominally depleted, partially depleted, substantially depleted, severely depleted and any combination thereof. Element 7: wherein extracting the natural gas from the subsurface formation via the first wellbore is preceded by extracting natural gas from the subsurface formation via the second wellbore and depleting a reservoir pressure of the subsurface formation via the second wellbore. Element 8: wherein depleting the reservoir pressure of the subsurface formation further comprises maintaining a reservoir pressure operable as a cushion gas. Element 9: the method further comprising enhancing reservoir pressure of the natural gas in the subsurface formation with the $CO_2$ brine and maintaining reservoir pressure of the hydrogen injected into the subsurface formation via the natural gas operating as a cushion gas against the hydrogen. Element 10: the method further comprising extracting the hydrogen from the subsurface formation using the reservoir pressure maintained by the cushion gas. Element 11: wherein injecting the at least a portion of the hydrogen into the subsurface formation via the second wellbore further comprises conveying the hydrogen through a hydrogen separation membrane system arranged within the second wellbore and capturing and separating contaminants from the hydrogen with the hydrogen separation membrane system.

By way of non-limiting example, exemplary combinations applicable to A, B and C include: Element 1 with Element 2; Element 1 with Element 3; Element 3 with Element 4; Element 5 with Element 6; Element 7 with Element 8; Element 9 with Element 10; Element 15 with Element 16; and Element 16 with Element 17.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method, comprising:
    extracting natural gas from a subsurface formation including a conventional gas reservoir via a first wellbore penetrating the subsurface formation;
    processing the natural gas in a surface processing facility and thereby generating hydrogen and a carbon dioxide ($CO_2$) brine;
    injecting at least a portion of the hydrogen into the subsurface formation via a second wellbore penetrating the subsurface formation for hydrogen storage;
    maintaining reservoir pressure of the hydrogen injected into the subsurface formation via the natural gas operating as a cushion gas against the hydrogen; and
    injecting the $CO_2$ brine into a saline aquifer forming part of the subsurface formation via a third wellbore penetrating the subsurface formation.

2. The method of claim 1, wherein processing the natural gas comprises:
    generating $CO_2$ from a methane reforming process; and
    mixing the $CO_2$ with produced water to produce the $CO_2$ brine.

3. The method of claim 2, wherein the methane reforming process is selected from the group consisting of steam methane reforming (SMR), autothermal reforming (ATR), dry reforming (DRM), partial oxidation (POX), pyrolysis, $H_2S$ Methane reforming, and any combination thereof.

4. The method of claim 2, wherein generating the $CO_2$ from the methane reforming process is preceded by extracting hydrogen sulfide and carbon dioxide from the natural gas in a gas processing treatment.

5. The method of claim 4, further comprising subjecting the natural gas to amine gas treating.

6. The method of claim 1, wherein extracting the natural gas from the subsurface formation via the first wellbore is preceded by extracting natural gas from the subsurface formation via the second wellbore until a reservoir pressure at the second wellbore descends below a predetermined reservoir pressure.

7. The method of claim 1, wherein extracting the natural gas from the subsurface formation via the first wellbore is preceded by:
    extracting natural gas from the subsurface formation via the second wellbore; and
    depleting a reservoir pressure of the subsurface formation via the second wellbore.

8. The method of claim 1, further comprising enhancing reservoir pressure of the natural gas in the subsurface formation with the $CO_2$ brine.

9. The method of claim 8, further comprising extracting the hydrogen from the subsurface formation using the reservoir pressure maintained by the cushion gas.

10. The method of claim 1, wherein injecting the at least a portion of the hydrogen into the subsurface formation via the second wellbore further comprises:
    conveying the hydrogen through a hydrogen separation membrane system arranged within the second wellbore; and
    capturing and separating contaminants from the hydrogen with the hydrogen separation membrane system.

11. A closed-loop hydrogen production system, comprising:
    a first wellbore penetrating a depleting subsurface formation for extracting natural gas from a conventional natural gas reservoir;
    a surface processing facility in fluid communication with the first wellbore to receive and process the natural gas and thereby generate hydrogen ($H_2$) and a carbon dioxide ($CO_2$) brine;
    a second wellbore penetrating the subsurface formation for injecting at least a portion of the hydrogen into the subsurface formation for storage, wherein reservoir pressure is maintained during injection of the hydrogen via the natural gas operating as a cushion gas against the hydrogen; and
    a third wellbore penetrating the subsurface formation for injecting the $CO_2$ brine into a saline aquifer forming part of the subsurface formation.

12. The closed-loop hydrogen production system of claim 11, further comprising a hydrogen separation membrane system arranged within the second wellbore and operable to separate contaminants from the hydrogen.

13. The closed-loop hydrogen production system of claim 11, wherein the surface processing facility includes equipment designed to undertake a methane reformation process selected from the group consisting of steam methane reforming (SMR), autothermal reforming (ATR), dry reforming (DRM), partial oxidation (POX), pyrolysis, $H_2S$ Methane reforming, and any combination thereof.

14. A method, comprising:
    extracting natural gas from a conventional subsurface formation including a gas reservoir via a first wellbore penetrating the subsurface formation;
    processing the natural gas in a surface processing facility and thereby generating hydrogen and a carbon dioxide (CO2) brine;
    injecting the CO2 brine into an aquifer forming part of the subsurface formation via a second wellbore penetrating the subsurface formation;
    injecting at least a portion of the hydrogen into the subsurface formation for storage via a third wellbore penetrating the subsurface formation;
    maintaining reservoir pressure of the hydrogen injected into the subsurface formation via the natural gas operating as a cushion gas against the hydrogen; and
    supporting reservoir pressure of the conventional subsurface formation with the CO2 brine.

15. The method of claim 14, wherein processing the natural gas comprises:
    generating $CO_2$ from a methane reforming process; and
    mixing the $CO_2$ with produced water to produce the $CO_2$ brine.

16. The method of claim 14, further comprising
extracting the hydrogen from the subsurface formation via the third wellbore using the reservoir pressure maintained by the cushion gas.

17. The method of claim 16, wherein the cushion gas comprises natural gas remaining in the gas reservoir after the natural gas is extracted from the first wellbore.

* * * * *